United States Patent
Cheng et al.

(10) Patent No.: US 12,063,556 B2
(45) Date of Patent: Aug. 13, 2024

(54) LOW LATENCY HANDOVER BETWEEN SECONDARY NODES

(71) Applicant: QUALCOMM Incorporated, San Diego, CA (US)

(72) Inventors: Peng Cheng, Beijing (CN); Karthika Paladugu, San Diego, CA (US); Gavin Bernard Horn, La Jolla, CA (US); Punyaslok Purkayastha, San Diego, CA (US); Ozcan Ozturk, San Diego, CA (US); Masato Kitazoe, Tokyo (JP); Huichun Liu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 17/597,819

(22) PCT Filed: Aug. 15, 2019

(86) PCT No.: PCT/CN2019/100712
§ 371 (c)(1),
(2) Date: Jan. 25, 2022

(87) PCT Pub. No.: WO2021/026856
PCT Pub. Date: Feb. 18, 2021

(65) Prior Publication Data
US 2022/0295356 A1    Sep. 15, 2022

(51) Int. Cl.
*H04W 4/00*    (2018.01)
*H04W 36/00*    (2009.01)

(52) U.S. Cl.
CPC .............................. *H04W 36/0055* (2013.01)

(58) Field of Classification Search
CPC ......... H04W 36/0055; H04W 36/0061; H04W 36/00835; H04W 36/0094; H04W 74/0833; H04W 36/0072; H04W 36/0069
See application file for complete search history.

(56) References Cited

U.S. PATENT DOCUMENTS

2017/0055187 A1 *  2/2017  Kang ................ H04W 36/0069
2017/0303286 A1   10/2017  Sang et al.
(Continued)

FOREIGN PATENT DOCUMENTS

CN          108282825 A        7/2018
WO    WO-2016116879 A1 *    7/2016    ........ H04W 36/0072
(Continued)

OTHER PUBLICATIONS

CATT: "Control Plane Procedures for LTE and NR Interworking", 3GPP TSG-RAN WG2 Meeting #97, R2-1700978, Feb. 17, 2017(Feb. 17, 2017) the whole document, 3 pages.
(Continued)

Primary Examiner — Thai D Hoang
(74) Attorney, Agent, or Firm — QUALCOMM Incorporated (57) ABSTRACT

This disclosure provides systems, methods, and apparatuses for low latency handover between secondary nodes (SNs). In one aspect, a user equipment (UE) may receive a configuration for a plurality of SNs, receive a command to communicate via an SN of the plurality of the SNs, and determine a handover procedure that is to be used to establish a connection with the SN. The handover procedure may be a random access channel (RACH)-less or a two-step RACH procedure and is determined to be used based on a determination that uplink time synchronization is established with the SN.

28 Claims, 6 Drawing Sheets

(56) References Cited

U.S. PATENT DOCUMENTS

2019/0394685 A1* 12/2019 Sharma ............. H04W 36/0055
2021/0068016 A1* 3/2021 Shi ........................ H04W 36/08

FOREIGN PATENT DOCUMENTS

| WO | WO-2018067063 A1 * | 4/2018 | ........ H04W 36/0072 |
| WO | WO-2018085762 A1 * | 5/2018 | |
| WO | WO-2018142308 A1 | 8/2018 | |
| WO | 2018219352 A1 | 12/2018 | |
| WO | 2019024936 A1 | 2/2019 | |
| WO | WO-2019160342 A1 * | 8/2019 | ............. H04L 5/005 |
| WO | WO-2020057732 A1 * | 3/2020 | ........ H04W 36/0055 |

OTHER PUBLICATIONS

International Search Report and Written Opinion—PCT/CN2019/100712—ISA/EPO—May 15, 2020.

Nokia., et al., "RACH-less HO in Beam-based System", 3GPP TSG-RAN WG2 Meeting #106, R2-1907267, 3rd Generation Partnership Project (3GPP), Mobile Competence Centre, 650, Route Des Lucioles, F-06921, Sophia-Antipolis Cedex, France, vol. RAN WG2, No. Reno, USA, May 13, 2019-May 17, 2019, May 2, 2019, 5 Pages, XP051711553, Section 2.3.

Qualcomm Incorporated: "Supporting RACH-less for fast SN Addition", 3GPP TSG RAN WG2 Meeting #105bis, R2-1904308, 3rd Generation Partnership Project (3GPP), Mobile Competence Centre, 650, Route Des Lucioles, F-06921 Sophia-Antipolis Cedex, France, vol. RAN WG2, No. Xian, China, Apr. 8, 2019-Apr. 12, 2019, Mar. 29, 2019, 4 Pages, XP051693530, Section 2.2.

Supplementary European Search Report—EP19941626—Search Authority—Munich—Apr. 13, 2023.

ZTE Corporation., et al., "2-step RACH HO Instead of RACH-less HO", 3GPP TSG RAN WG2 Meeting #106, R2-1907088, 3rd Generation Partnership Project (3GPP), Mobile Competence Centre, 650, Route Des Lucioles, F-06921, Sophia-Antipolis Cedex, France, vol. RAN WG2, No. Reno, USA, May 13, 2019-May 17, 2019, May 3, 2019, 6 Pages, XP051711385, Section 2.

\* cited by examiner

LOW LATENCY HANDOVER BETWEEN SECONDARY NODES

CROSS-REFERENCE TO RELATED APPLICATION

This application is a 371 national stage of PCT Application No. PCT/CN2019/100712 filed on Aug. 15, 2019, entitled "LOW LATENCY SWITCHING BETWEEN SECONDARY NODES," which is hereby expressly incorporated by reference herein.

TECHNICAL FIELD

Aspects of the present disclosure relate generally to wireless communication, and more particularly to techniques for low latency handover between secondary nodes.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, a 5G NodeB, or the like.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by a user equipment (UE). The method may include receiving a configuration for a plurality of secondary nodes (SNs); receiving a command to communicate via an SN of the plurality of the SNs; determining a handover procedure that is to be used to establish a connection with the SN; and performing the handover procedure to establish the connection with the SN.

In some aspects, the plurality of SNs are candidates to provide dual connectivity with a master node.

In some aspects, the handover procedure is a random access channel-less procedure and is determined to be used based on a determination that uplink time synchronization is established with the SN.

In some aspects, the configuration identifies one or more TCI states for each respective SN of the plurality of SNs. In some aspects, performing the handover procedure includes selecting a TCI state of one or more TCI states identified in the configuration for the SN, and transmitting, to the SN and using a beam indicated by the TCI state, a message indicating a switch to the SN for dual connectivity with a master node. In some aspects, the TCI state identifies information associated with a reference signal, and the TCI state is selected based on the information associated with the reference signal.

In some aspects, the method can include transmitting a request to activate the SN, where the request identifies a particular beam of the SN, and the command to communicate via the SN is based on the request. In some aspects, the command identifies an activated TCI state for the SN. In some aspects, the method can include monitoring a physical downlink control channel of the SN according to the activated TCI state to obtain uplink grant information, and transmitting, to the SN and according to the uplink grant information, a message indicating a switch to the SN for dual connectivity with a master node.

In some aspects, the handover procedure is a two-step RACH procedure and is determined to be used based on a determination that uplink time synchronization is not established with the SN. In some aspects, performing the handover procedure includes transmitting, in a msgA communication of a two-step RACH procedure, a message indicating a switch to the SN for dual connectivity with a master node, and receiving, in a msgB communication of the two-step RACH procedure, information that identifies a timing advance for communications with the SN. In some aspects, a first RACH occasion in the msgA communication identifies a particular beam of the SN.

In some aspects, the handover procedure is a four-step RACH procedure and is determined to be used based on a determination that transmission of a msgA communication of a two-step RACH procedure failed.

Another innovative aspect of the subject matter described in this disclosure can be implemented in a UE for wireless communication. The UE may include memory and one or more processors operatively coupled to the memory. The memory and the one or more processors may be configured to receive a configuration for a plurality of SNs; receive a command to communicate via an SN of the plurality of the SNs; determine a handover procedure that is to be used to establish a connection with the SN; and perform the handover procedure to establish the connection with the SN.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive a configuration for a plurality of SNs; receive a command to communicate via an SN of the plurality of the SNs; determine a handover procedure that is to be used to establish a connection with the SN; and perform the handover procedure to establish the connection with the SN.

Another innovative aspect of the subject matter described in this disclosure can be implemented in an apparatus for wireless communication. The apparatus for wireless communication may include means for receiving a configuration for a plurality of SNs; means for receiving a command to communicate via an SN of the plurality of the SNs; means for determining a handover procedure that is to be used to establish a connection with the SN; and means for performing the handover procedure to establish the connection with the SN.

Another innovative aspect of the subject matter described in this disclosure can be implemented in an apparatus for wireless communication. The apparatus for wireless communication may include a first interface to receive a configuration for a plurality of SNs; a second interface to receive a command to communicate via an SN of the plurality of the SNs; a third interface to determine a handover procedure that is to be used to establish a connection with the SN; and a fourth interface to perform the handover procedure to establish the connection with the SN.

Aspects generally include a method, apparatus, system, computer program product, non-transitory computer-readable medium, user equipment, base station, wireless communication device, and/or processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

To synchronize a connection in an uplink direction, a user equipment (UE) and a base station may perform a random access (RACH) procedure. In some aspects, the UE and the base station may perform a four-step RACH procedure. In a four-step RACH procedure, the UE and the base station may exchange four primary RACH communications. The UE may transmit a first message, i.e., msg1 communication, to the base station. The msg1 communication may include a RACH preamble communication. The base station may respond to the msg1 communication with a second message, i.e., msg2 communication, which may include a random access response (RAR) communication. The UE may respond to the msg2 communication with a third message, i.e., msg3 communication, which may include a radio resource control (RRC) connection request communication. The base station may respond to the msg3 communication with a fourth message, i.e., msg4 communication, which may include a medium access control (MAC) control element (MAC-CE) contention resolution identifier communication.

In some cases, the four-step RACH procedure may not meet the low latency requirements of NR wireless systems. Accordingly, the UE and the base station may use a two-step RACH procedure to reduce latency in synchronizing the connection in the uplink direction. In a two-step RACH procedure, the UE may combine the msg1 communication and the msg3 communication into a set of communications referred to as a msgA communication. The msg1 communication may be referred to as the preamble of the msgA communication and the msg3 communication may be referred to as the payload of the msgA communication. In this way, the UE transmits the msg1 communication and the msg3 communication sequentially or simultaneously with each other and prior to receiving the msg2 communication and the msg4 communication. The base station may receive the msgA communication and may transmit a msgB communication, which may include the msg2 communication and the msg4 communication.

A RACH procedure, such as a four-step RACH procedure, may increase handover latency in dual connectivity communications, thereby reducing throughput of dual connectivity communications.

Particular implementations of the subject matter described in this disclosure can be implemented to realize one or more of the following potential advantages. In some aspects, the techniques and apparatuses described herein provide a RACH-less procedure and a two-step RACH procedure for handover in dual connectivity communications, thereby reducing latency of dual connectivity communications relative to a four-step RACH procedure. In addition, the techniques and apparatuses described herein provide a mechanism for selecting between a RACH-less procedure and a two-step RACH procedure, thereby enabling efficient selection of a low-latency handover procedure. Moreover, the techniques and apparatuses described herein facilitate selection and use of a particular beam for dual connectivity communications, thereby improving reliability, speed, and throughput of dual connectivity communications after handover.

Figure 1:
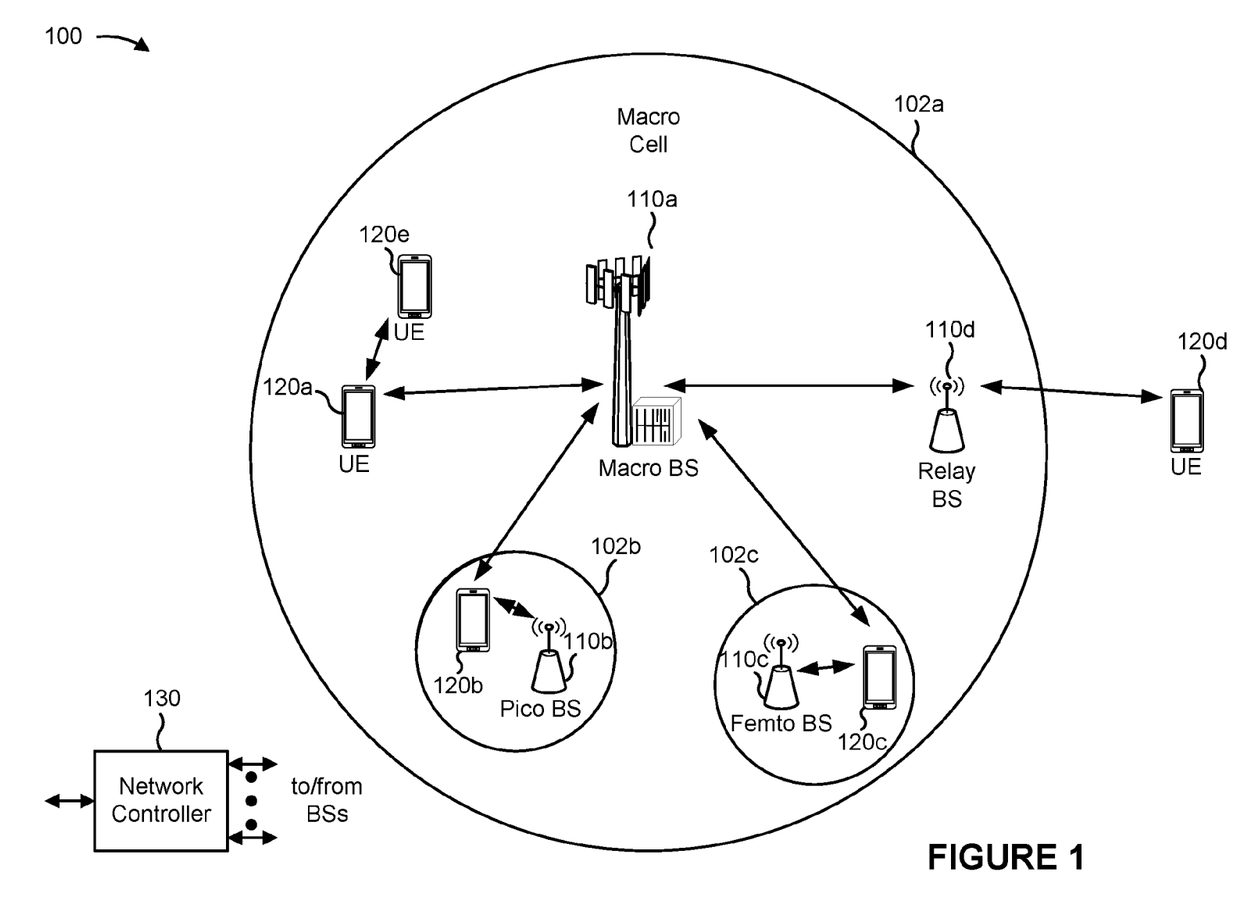
FIG. 1 is a block diagram conceptually illustrating an example of a wireless network.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with UEs and also may be referred to as a base station, a NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
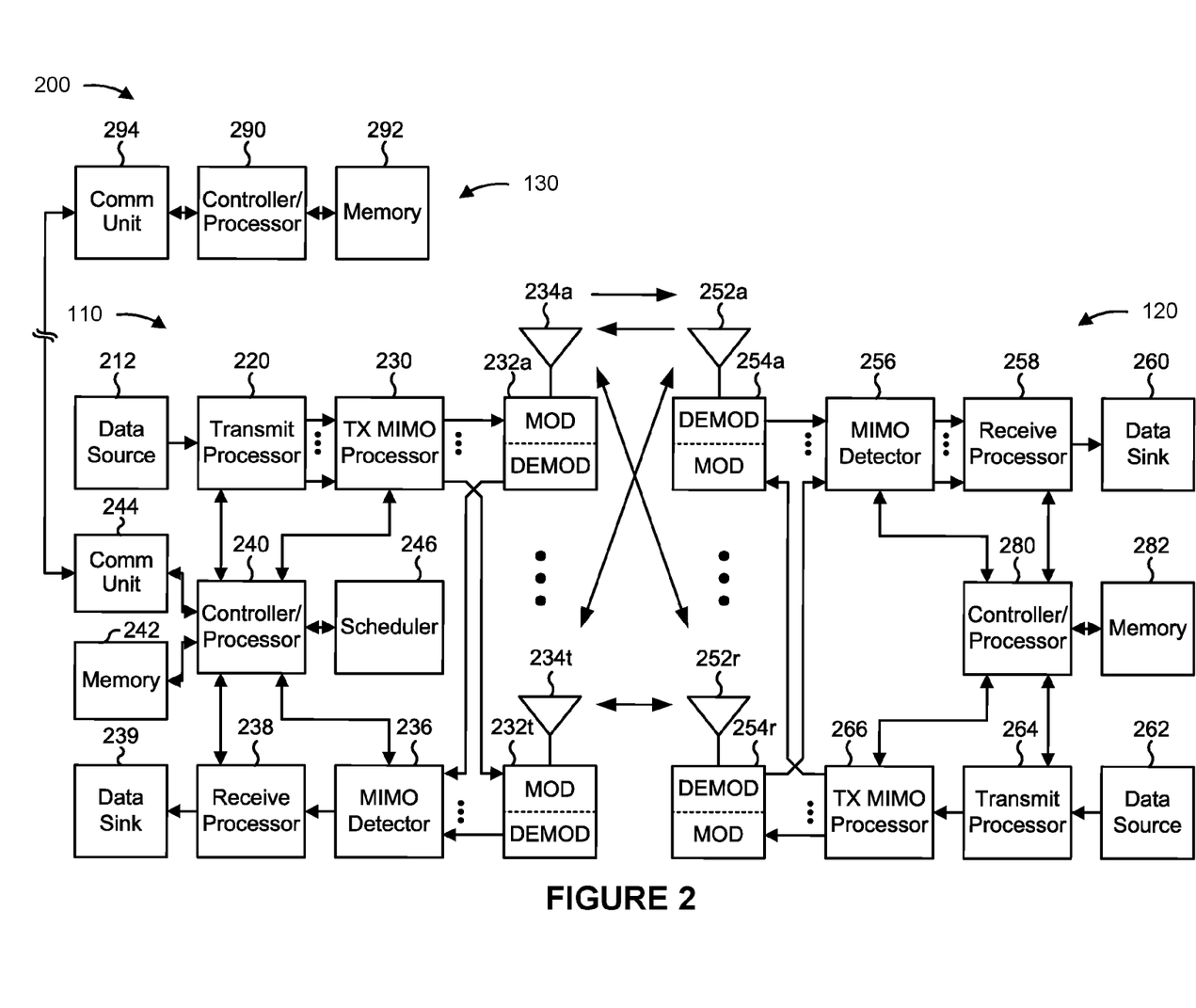
FIG. 2 is a block diagram conceptually illustrating an example of a base station in communication with a user equipment (UE) in a wireless network.

FIG. 2 is a block diagram conceptually illustrating an example 200 of a base station 110 in communication with a UE 120. In some aspects, base station 110 and UE 120 may respectively be one of the base stations and one of the UEs in wireless network 100 of FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include communication unit 244 and communicate to network controller 130 via communication unit 244. The network controller 130 may include communication unit 294, a controller or processor (i.e., controller/processor) 290, and memory 292.

The controller/processor 240 of base station 110, the controller/processor 280 of UE 120, or any other component(s) of FIG. 2 may perform one or more techniques associated with low latency handover between secondary nodes (SNs), as described in more detail elsewhere herein. For example, the controller/processor 240 of base station 110, the controller/processor 280 of UE 120, or any other component(s) (or combinations of components) of FIG. 2 may perform or direct operations of, for example, process 600 of FIG. 6, or other processes as described herein. The memories 242 and 282 may store data and program codes for base station 110 and UE 120, respectively.

Figure 6:
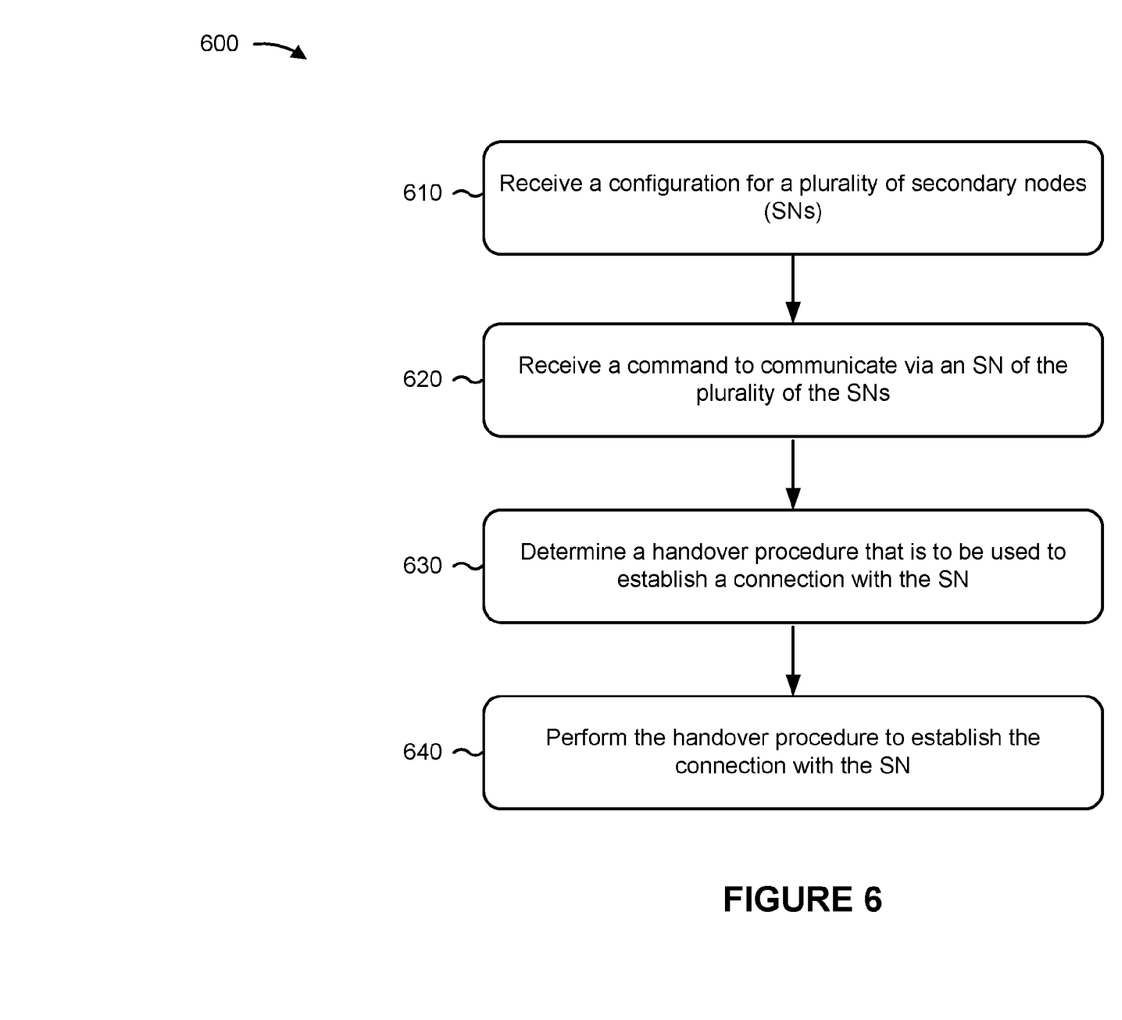
FIG. 6 is a diagram illustrating an example process performed, for example, by a UE.

The stored program codes, when executed by the controller/processor 280 or other processors and modules at UE 120, may cause the UE 120 to perform operations described with respect to process 600 of FIG. 6, or other processes as described herein. A scheduler 246 may schedule UEs for data transmission on the downlink, the uplink, or a combination thereof.

In some aspects, the UE 120 may include means for receiving a configuration for a plurality of SNs, means for receiving a command to communicate via an SN of the plurality of the SNs, means for determining a handover procedure that is to be used to establish a connection with the SN, means for performing the handover procedure to establish the connection with the SN, or combinations thereof. In some aspects, such means may include one or more components of the UE 120 described in connection with FIG. 2. For example, UE 120 may include a first interface providing means for receiving a configuration for a plurality of SNs, a second interface proving means for receiving a command to communicate via an SN of the plurality of the SNs, a third interface providing means for determining a handover procedure that is to be used to establish a connection with the SN, a fourth interface providing means for performing the handover procedure to establish the connection with the SN, or combinations thereof.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
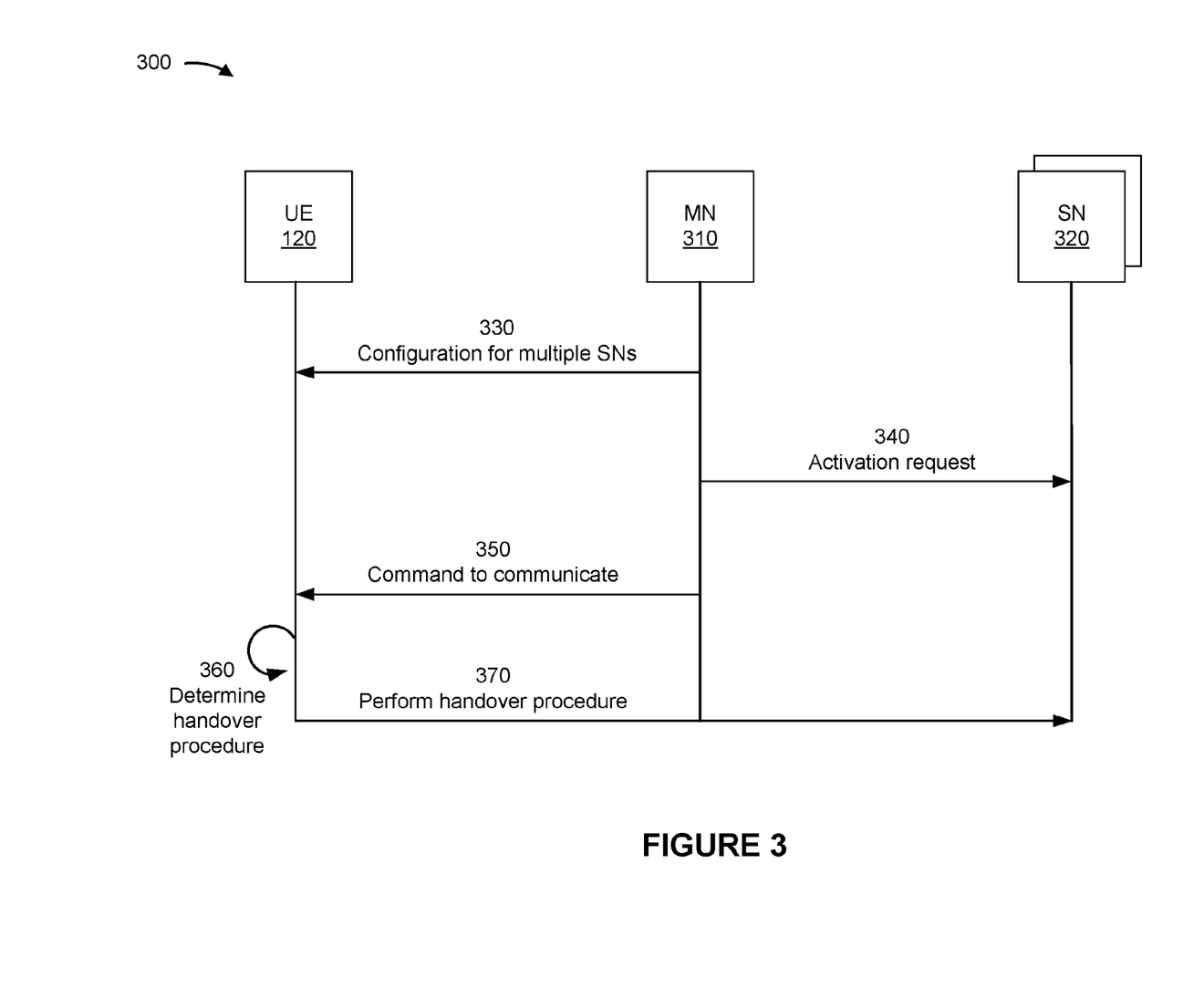
FIGS. 3-5 are diagrams illustrating examples of low latency handover between secondary nodes.

FIG. 3 is a diagram illustrating an example 300 of low latency handover between SNs. In some aspects, as shown in FIG. 3, a handover procedure used for the low latency handover between SNs may be a RACH-less procedure. As also shown in FIG. 3, a master node (MN) 310 may configure a UE 120 for dual connectivity to a network via the MN 310 and one of multiple SNs 320. In some aspects, one or more of the MN 310 and the multiple SNs 320 may be a base station, such as a base station 110. For example, the MN 310 may be a first base station 110 and the SN 320 may be a second base station 110.

As shown in FIG. 3, and by reference number 330, the MN 310 may transmit (for example, via an RRCReconfiguration message), and the UE 120 may receive, a configuration for the multiple SNs 320 (for example, a configuration for secondary cell groups (SCGs) respectively associated with the multiple SNs 320). For example, the multiple SNs 320 may be configured to provide dual connectivity with the MN 310, and the MN 310 may thereafter transmit a configuration for the multiple SNs 320 to the UE 120. The configuration may identify the multiple SNs 320 as candidates to provide dual connectivity with the MN 310. The configuration may include information that identifies an SN 320 (for example, information that identifies a configured data radio bearer of the SN 320). The UE 120 may retain the configuration for the multiple SNs 320 during dual connectivity communications involving the MN 310 in order to enable switching between the multiple SNs based on the configuration.

In some aspects, the configuration may identify one or more transmission configuration indication (TCI) states for each of the multiple SNs 320. For example, the configuration may identify one or more first TCI states for a first SN 320 (for example, for a primary secondary cell (PSCell) of the first SN) of the multiple SNs 320 and one or more second TCI states for a second SN 320 (for example, a PSCell of the second SN) of the multiple SNs 320. In some aspects, a TCI state identified by the configuration may be associated with an uplink grant that is reserved for the UE 120.

As shown by reference number 340, the MN 310 may transmit an activation request (for example, a 5G secondary next generation NodeB (SgNB) activation request) to a target SN 320 of the multiple SNs 320 identified in the configuration provided to the UE 120, thereby causing activation of the SN 320 for dual connectivity with the MN 310. The MN 310 may transmit the activation request to the target SN 320 based on one or more measurements (for example, RRM measurements) obtained by the UE 120 that relate to the multiple SNs 320. For example, the one or more measurements may indicate an SN 320 (for example, the target SN 320) of the multiple SNs 320 that is providing a strongest signal to the UE 120. In some aspects, the UE 120 may monitor the one or more measurements relating to the multiple SNs 320 to detect satisfaction of a measurement condition (for example, a measurement condition specifying a threshold value for signal strength) by an SN 320 of the multiple SNs 320. In such a case, the UE 120 may transmit, and the MN 310 may receive, a request to activate the target SN 320 based on a determination that the measurement condition is satisfied, thereby causing the MN 310 to transmit the activation request to the target SN 320. In some aspects, the MN 310 also may transmit a deactivation request to a source SN 320 of the multiple SNs 320, thereby resulting in an SN switch from the source SN 320 to the target SN 320.

As shown by reference number 350, the MN 310 may transmit, and the UE 120 may receive, a command to communicate via the activated target SN 320. As shown by reference number 360, the UE 120 may determine a handover procedure that is to be used to establish a connection with the activated target SN 320. For example, the UE 120 may establish the connection using a RACH-less procedure, a two-step RACH procedure, or a four-step RACH procedure. In some aspects, the UE 120 may determine whether to use a RACH-less procedure or a two-step RACH procedure based on whether uplink time synchronization is established with the activated target SN 320. For example, the UE 120 may determine to use a RACH-less procedure when uplink time synchronization is established with the activated target SN 320. As another example, the UE 120 may determine to use a two-step RACH procedure when uplink time synchronization is not established with the activated target SN 320.

In some aspects, the UE 120 may determine to perform a RACH-less procedure based on a determination that uplink time synchronization is established with the activated target SN 320. The UE 120 may determine that uplink time synchronization is established with the activated target SN 320 when a timing advance of the activated target SN 320 is equal to zero. Additionally, or alternatively, the UE 120 may determine that uplink time synchronization is established with the activated target SN 320 when the source SN 320 and the activated target SN 320 are time synchronized (for example, timing advances associated with the source SN 320 and the activated target SN 320 are the same).

As shown by reference number 370, the UE 120 may perform the determined handover procedure. In some aspects, the UE 120 may perform a RACH-less procedure. The UE 120 may perform the RACH-less procedure by selecting a TCI state associated with the activated target SN 320. For example, the UE 120 may select a TCI state from the one or more TCI states configured for the activated target SN 320 identified in the configuration for the multiple SNs 320. In some aspects, the UE 120 may select the TCI state from the one or more TCI states according to a reference signal (for example, a channel state information reference signal (CSI-RS) or a synchronization signal block (SSB)) associated with the TCI state. For example, the UE 120 may select a TCI state associated with a reference signal that satisfies a threshold value (for example, a threshold power level or a threshold quality level of the reference signal).

After selecting a TCI state, the UE 120 may further perform the RACH-less procedure by transmitting a message (for example, an RRCReconfigurationComplete message) indicating that the UE 120 has switched to the activated target SN 320 for dual connectivity with the MN 310. A TCI state may provide an indication of a particular beam of the activated target SN 320. Accordingly, the UE 120 may transmit the message to the activated target SN 320 according to the uplink grant associated with the selected TCI state and using a beam corresponding to the particular beam indicated by the selected TCI state. In this way, the UE 120 may establish a connection with the activated target SN 320 without transmitting a RACH preamble to the activated target SN 320, thereby reducing latency associated with the handover to the activated target SN 320.

Figure 4:
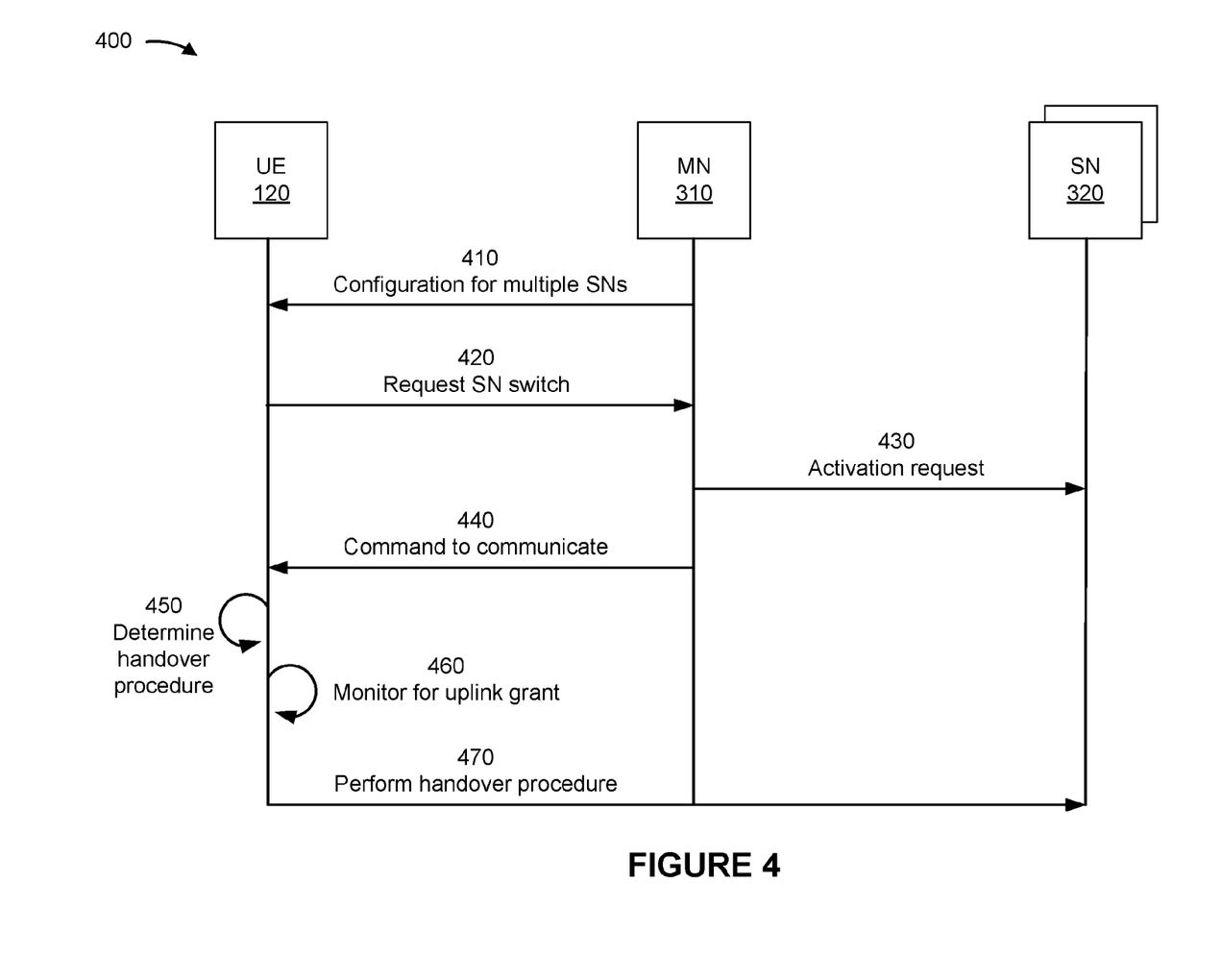

FIG. 4 is a diagram illustrating an example 400 of low latency handover between SNs. In some aspects, as shown in FIG. 4, a handover procedure used for the low latency handover between SNs may be a RACH-less procedure. As shown in FIG. 4, an MN 310 may configure a UE 120 for dual connectivity to a network via the MN 310 and one of multiple SNs 320.

As shown in FIG. 4, and by reference number 410, the MN 310 may transmit (for example, via an RRCReconfiguration message), and the UE 120 may receive, a configuration for the multiple SNs 320 (for example, a configuration for secondary cell groups (SCGs) respectively associated with the multiple SNs 320), as described in more detail above in connection with FIG. 3. In some aspects, the configuration may not identify one or more TCI states for the multiple SNs 320. In this way, resources for uplink grants that would be associated with the TCI states may be conserved.

As shown by reference number 420, the UE 120 may transmit, and the MN 310 may receive, a request to switch SNs for providing dual connectivity with the MN 310. The UE 120 may transmit (for example, in a physical uplink shared channel) the request to switch SNs via a MAC-CE or via a release assistance indication. In some aspects, the UE 120 may transmit the request to switch SNs based on a determination that a measurement condition (for example, a measurement condition specifying a threshold value for signal strength) is satisfied by a target SN 320 of the multiple SNs 320 configured to the UE 120. Accordingly, the request to switch SNs may identify the target SN 320.

In some aspects, the request to switch SNs may identify a particular beam (for example, by beam index) of the target SN 320. The particular beam may be a beam of the target SN 320 that is providing a strongest signal to the UE 120, or a beam of the target SN 320 with a signal strength that satisfies a threshold value. In some aspects, the request to switch SNs also may provide one or more measurements (for example, reference signal received power (RSRP) measurements, reference signal received quality (RSRQ) measurements, signal-to-noise ratio (SNR) measurements, signal-to-interference-plus-noise ratio (SINR) measurements) relating to the target SN 320.

As shown by reference number 430, the MN 310 may transmit an activation request (for example, an SgNB activation request) to an SN 320 of the multiple SNs 320 configured to the UE 120, as described in more detail above in connection with FIG. 3. For example, the MN 310 may transmit the activation request to the target SN 320 identified in the request to switch SNs transmitted by the UE 120, thereby causing activation of the target SN 320 for dual connectivity with the MN 310. In some aspects, the activation request may include information associated with the particular beam indicated in the request to switch SNs or the one or more measurements provided in the request to switch SNs. In this way, the activation request may enable the target SN 320 to determine and activate a TCI state for the UE 320.

As shown by reference number 440, the MN 310 may transmit, and the UE 120 may receive, a command to communicate via the activated target SN 320. In some aspects, the command to communicate may identify a TCI state that has been activated for the UE 120 (for example, a TCI state that has been activated based on the particular beam or the one or more measurements indicated by the UE 120).

As shown by reference number 450, the UE 120 may determine a handover procedure that is to be used to establish a connection with the activated target SN 320, as described in more detail above in connection with FIG. 3. In some aspects, the UE 120 may determine to perform a RACH-less procedure based on a determination that uplink synchronization is established with the activated target SN 320, as described in more detail above in connection with FIG. 3.

As shown by reference number 460, the UE 120 may monitor a physical downlink control channel (PDCCH) of the activated target SN 320 according to the activated TCI state. That is, the UE 120 may monitor the PDCCH according to a beam indicated by the activated TCI state. The UE 120 may monitor the PDCCH to obtain uplink grant information for a PUSCH communication.

As shown by reference number 470, the UE 120 may perform the determined handover procedure. In some aspects, the UE 120 may perform a RACH-less procedure. The UE 120 may perform the RACH-less procedure by transmitting a message (for example, an RRCReconfigurationComplete message) indicating that the UE 120 has switched to the activated target SN 320 for dual connectivity with the MN 310. The UE 120 may transmit the message to the activated target SN 320 according to the uplink grant and using the particular beam indicated by the activated TCI state. In this way, the UE 120 may establish a connection with the activated target SN 320 without transmitting a RACH preamble to the activated target SN 320, thereby reducing latency associated with the handover to SN 320.

Figure 5:
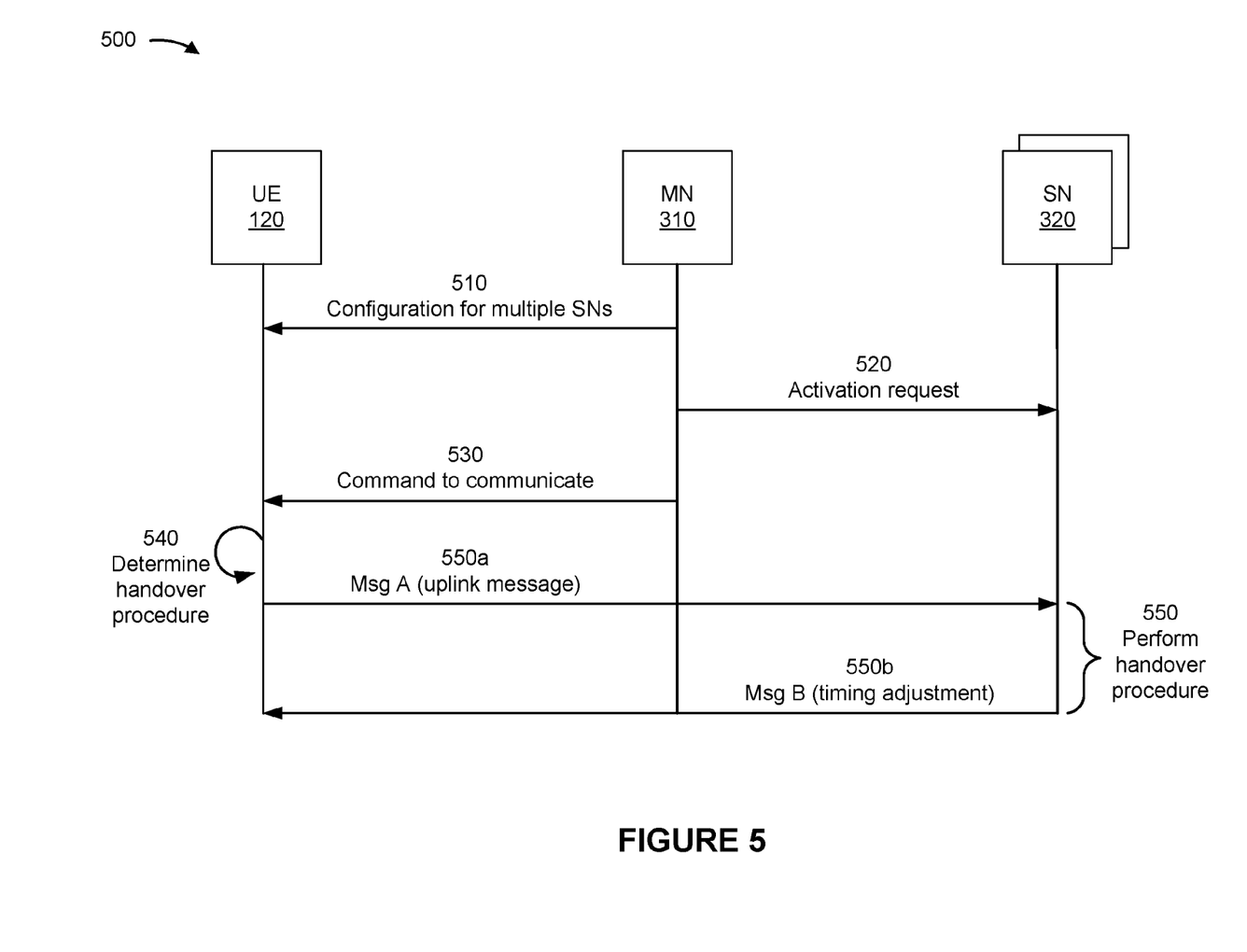

FIG. 5 is a diagram illustrating an example 500 of low latency handover between SNs. In some aspects, as shown in FIG. 5, a handover procedure used for the low latency handover between SNs may be a two-step RACH procedure.

As shown in FIG. 5, an MN 310 may configure a UE 120 for dual connectivity to a network via the MN 310 and one of multiple SNs 320.

As shown in FIG. 5, and by reference number 510, the MN 310 may transmit (for example, via an RRCReconfiguration message), and the UE 120 may receive, a configuration for the multiple SNs 320 (for example, a configuration for secondary cell groups (SCGs) respectively associated with the multiple SNs 320), as described in more detail above in connection with FIGS. 3 and 4. As shown by reference number 520, the MN 310 may transmit an activation request (for example, an SgNB activation request) to a target SN 320 of the multiple SNs 320 identified in the configuration provided to the UE 120, as described in more detail above in connection with FIGS. 3 and 4. As shown by reference number 530, the MN 310 may transmit, and the UE 120 may receive, a command to communicate via the activated target SN 320, as described in more detail above in connection with FIGS. 3 and 4.

As shown by reference number 540, the UE 120 may determine a handover procedure that is to be used to establish a connection with the activated target SN 320. For example, the UE 120 may determine whether to use a RACH-less procedure or a two-step RACH procedure based on whether uplink synchronization is established with the activated target SN 320, as described in more detail above in connection with FIG. 3.

As shown in FIG. 5, the UE 120 may determine to perform a two-step RACH procedure based on a determination that uplink synchronization is not established with the activated target SN 320. The UE 120 may determine that uplink synchronization is not established with the activated target SN 320 when a timing advance of the activated target SN 320 is not equal to zero. Additionally, or alternatively, the UE 120 may determine that uplink synchronization is not established with the activated target SN 320 when a source SN 320 and the activated target SN 320 are not time synchronized (for example, timing advances associated with the source SN 320 and the activated target SN 320 are different).

As shown by reference number 550, the UE 120 may perform the determined handover procedure. As shown in FIG. 5, the UE 120 may perform a two-step RACH procedure. The UE 120 may perform the two-step RACH procedure by transmitting a msgA communication 550a to the activated target SN 320 and receiving a msgB communication 550b from the activated target SN 320.

In some aspects, the msgA communication may include a RACH preamble and a PUSCH transmission. According to the two-step RACH procedure, the UE 120 may transmit, in the PUSCH transmission, a message (for example, an RRCReconfigurationComplete message) indicating that the UE 120 has switched to the activated target SN 320 for dual connectivity with the MN 310. In addition, the UE 120 may transmit, in the PUSCH transmission, information that identifies a data radio bearer configured by the activated target SN 320 for the UE 120. In some aspects, the msgA communication may be transmitted by the UE 120 prior to receiving an RAR message from the activated target SN 320. In some aspects, the UE 120 may use a first RACH occasion in the msgA communication to identify a particular beam of the activated target SN 320. The particular beam may be a beam of the activated target SN 320 that is providing a strongest signal to the UE 120, or a beam of the activated target SN 320 with a signal strength that satisfies a threshold value.

Thereafter, the activated target SN 320 may transmit, and the UE 120 may receive, a msgB communication. The msgB communication may indicate a timing advance that the UE 120 is to use to communicate with the activated target SN 320. In this way, the UE 120 may establish a connection with the activated target SN 320 using a two-step RACH procedure, thereby reducing latency associated with handover, relative to a four-step RACH procedure.

In some aspects, the msgA communication to the activated target SN 320 may fail. For example, the UE 120 may attempt to transmit msgA communications to the activated target SN 320 over a particular time period, and the msgA communications to the activated target SN 320 may fail (which may be indicated by an absence of a msgB communication from the activated target SN 320). In such cases, the UE may determine to perform a four-step RACH procedure based on a determination that the particular time period for transmitting msgA communications has expired. According to the four-step RACH procedure, the UE 120 may transmit, in a msg3 communication of the four-step RACH procedure, a message (for example, an RRCReconfigurationComplete message) indicating that the UE 120 has switched to the activated target SN 320 for dual connectivity with the MN 310.

FIG. 6 is a diagram illustrating an example process 600 performed, for example, by a UE, in accordance with various aspects of the present disclosure. The example process 600 shows where a UE, such as the UE 120, performs operations associated with low latency handover between secondary nodes.

As shown in FIG. 6, in some aspects, the process 600 may include receiving a configuration for a plurality of SNs (block 610). For example, the UE (for example, using receive processor 258, controller/processor 280, memory 282) may receive a configuration for a plurality of SNs, as described above.

As shown in FIG. 6, in some aspects, the process 600 may include receiving a command to communicate via an SN of the plurality of the SNs (block 620). For example, the UE (for example, using receive processor 258, controller/processor 280, memory 282) may receive a command to communicate via an SN of the plurality of the SNs, as described above.

As shown in FIG. 6, in some aspects, the process 600 may include determining a handover procedure that is to be used to establish a connection with the SN (block 630). For example, the UE (for example, using controller/processor 280, memory 282, and/or the like) may determine a handover procedure that is to be used to establish a connection with the SN, as described above.

As shown in FIG. 6, in some aspects, the process 600 may include performing the handover procedure to establish the connection with the SN (block 640). For example, the UE (for example, using receive processor 258, transmit processor 264, controller/processor 280, memory 282) may perform the handover procedure to establish the connection with the SN, as described above.

The process 600 may include additional aspects, such as any single aspect or any combination of aspects described below and/or in connection with one or more other processes described elsewhere herein.

In a first aspect, the plurality of SNs are candidates to provide dual connectivity with a master node.

In a second aspect, alone or in combination with the first aspect, the handover procedure is a random access channel-less procedure and is determined to be used based on a determination that uplink time synchronization is established with the SN.

In a third aspect, alone or in combination with one or more of the first and second aspects, the configuration identifies one or more TCI states for each respective SN of the plurality of SNs. In a fourth aspect, alone or in combination with one or more of the first through third aspects, performing the handover procedure includes selecting a TCI state of one or more TCI states identified in the configuration for the SN, and transmitting, to the SN and using a beam indicated by the TCI state, a message indicating a switch to the SN for dual connectivity with a master node. In a fifth aspect, alone or in combination with one or more of the first through fourth aspects, the TCI state identifies information associated with a reference signal, and the TCI state is selected based on the information associated with the reference signal.

In a sixth aspect, alone or in combination with one or more of the first through fifth aspects, process 600 further includes transmitting a request to activate the SN, where the request identifies a particular beam of the SN, and the command to communicate via the SN is based on the request. In a seventh aspect, alone or in combination with one or more of the first through sixth aspects, the command identifies an activated TCI state for the SN. In an eighth aspect, alone or in combination with one or more of the first through seventh aspects, process 600 further includes monitoring a physical downlink control channel of the SN according to the activated TCI state to obtain uplink grant information, and transmitting, to the SN and according to the uplink grant information, a message indicating a switch to the SN for dual connectivity with a master node.

In a ninth aspect, alone or in combination with one or more of the first through eighth aspects, the handover procedure is a two-step RACH procedure and is determined to be used based on a determination that uplink time synchronization is not established with the SN. In a tenth aspect, alone or in combination with one or more of the first through ninth aspects, performing the handover procedure includes transmitting, in a msgA communication of a two-step RACH procedure, a message indicating a switch to the SN for dual connectivity with a master node, and receiving, in a msgB communication of the two-step RACH procedure, information that identifies a timing advance for communications with the SN. In an eleventh aspect, alone or in combination with one or more of the first through tenth aspects, a first RACH occasion in the msgA communication identifies a particular beam of the SN.

In a twelfth aspect, alone or in combination with one or more of the first through eleventh aspects, the handover procedure is a four-step RACH procedure and is determined to be used based on a determination that transmission of a msgA communication of a two-step RACH procedure failed.

Although FIG. 6 shows example blocks of the process 600, in some aspects, the process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a user equipment (UE), comprising:
   receiving a configuration for a plurality of secondary nodes (SNs);
   receiving a command to communicate via an SN of the plurality of the SNs;
   determining a handover procedure that is to be used to establish a connection with the SN; and
   performing the handover procedure to establish the connection with the SN, the handover procedure including selecting a TCI state of one or more TCI states identified in the configuration for the SN and transmitting, to the SN and using a beam indicated by the TCI state, a message indicating a switch to the SN for dual connectivity with a master node.

2. The method of claim 1, wherein the plurality of SNs are candidates to provide dual connectivity with a master node.

3. The method of claim 1, wherein the handover procedure is a random access channel-less procedure and is determined to be used based on a determination that uplink time synchronization is established with the SN.

4. The method of claim 1, wherein the configuration identifies one or more transmission configuration indication (TCI) states for each respective SN of the plurality of SNs.

5. The method of claim 1, wherein the TCI state identifies information associated with a reference signal, and wherein the TCI state is selected based on the information associated with the reference signal.

6. The method of claim 1, further comprising transmitting a request to activate the SN, wherein the request identifies a particular beam of the SN, and wherein the command to communicate via the SN is based on the request.

7. The method of claim 6, wherein the command identifies an activated transmission configuration indication (TCI) state for the SN.

8. The method of claim 7, further comprising monitoring a physical downlink control channel of the SN according to the activated TCI state to obtain uplink grant information; and
   wherein transmitting the message indicating a switch to the SN for dual connectivity with a master node is in accordance with the uplink grant information.

9. The method of claim 1, wherein the handover procedure is a two-step random access channel procedure and is determined to be used based on a determination that uplink time synchronization is not established with the SN.

10. The method of claim 1, wherein performing the handover procedure further comprises transmitting, in a msgA communication of a two-step random access channel (RACH) procedure, the message indicating a switch to the SN for dual connectivity with a master node; and
    receiving, in a msgB communication of the two-step RACH procedure, information that identifies a timing advance for communications with the SN.

11. The method of claim 10, wherein a first RACH occasion in the msgA communication identifies a particular beam of the SN.

12. The method of claim 1, wherein the handover procedure is a four-step random access channel (RACH) procedure and is determined to be used based on a determination that transmission of a msgA communication of a two-step RACH procedure failed.

13. A user equipment (UE) for wireless communication, comprising:
    a memory; and
    one or more processors operatively coupled to the memory, the memory and the one or more processors configured to:
    receive a configuration for a plurality of secondary nodes (SNs);

receive a command to communicate via an SN of the plurality of the SNs;

determine a handover procedure that is to be used to establish a connection with the SN; and perform the handover procedure to establish the connection with the SN, the handover procedure including selecting a TCI state of one or more TCI states identified in the configuration for the SN and transmitting, to the SN and using a beam indicated by the TCI state, a message indicating a switch to the SN for dual connectivity with a master node.

14. The UE of claim 13, wherein the plurality of SNs are candidates to provide dual connectivity with a master node.

15. The UE of claim 13, wherein the handover procedure is a random access channel-less procedure and is determined to be used based on a determination that uplink time synchronization is established with the SN.

16. The UE of claim 13, wherein the configuration identifies one or more transmission configuration indication (TCI) states for each respective SN of the plurality of SNs.

17. The UE of claim 13, wherein the TCI state identifies information associated with a reference signal, and wherein the TCI state is selected based on the information associated with the reference signal.

18. The UE of claim 13, wherein the memory and the one or more processors are further configured to transmit a request to activate the SN, wherein the request identifies a particular beam of the SN, and wherein the command to communicate via the SN is based on the request.

19. The UE of claim 18, wherein the command identifies an activated transmission configuration indication (TCI) state for the SN.

20. The UE of claim 19, wherein the memory and the one or more processors are further configured to:

monitor a physical downlink control channel of the SN according to the activated TCI state to obtain uplink grant information; and wherein the transmission of the message indicating a switch to the SN for dual connectivity with a master node is in accordance with the uplink grant information.

21. The UE of claim 13, wherein the handover procedure is a two-step random access channel procedure and is determined to be used based on a determination that uplink time synchronization is not established with the SN.

22. The UE of claim 13, wherein the memory and the one or more processors, to perform the handover procedure, are further configured to:

transmit, in a msgA communication of a two-step random access channel (RACH) procedure, the message indicating a switch to the SN for dual connectivity with a master node; and receive, in a msgB communication of the two-step RACH procedure, information that identifies a timing advance for communications with the SN.

23. The UE of claim 22, wherein a first RACH occasion in the msgA communication identifies a particular beam of the SN.

24. The UE of claim 13, wherein the handover procedure is a four-step random access channel (RACH) procedure and is determined to be used based on a determination that transmission of a msgA communication of a two-step RACH procedure failed.

25. A non-transitory computer-readable medium storing one or more instructions for wireless communication, the one or more instructions comprising:

one or more instructions that, when executed by one or more processors of a user equipment (UE), cause the one or more processors to:

receive a configuration for a plurality of secondary nodes (SNs);

receive a command to communicate via an SN of the plurality of the SNs;

determine a handover procedure that is to be used to establish a connection with the SN; and perform the handover procedure to establish the connection with the SN, the handover procedure including selecting a TCI state of one or more TCI states identified in the configuration for the SN and transmitting, to the SN and using a beam indicated by the TCI state, a message indicating a switch to the SN for dual connectivity with a master node.

26. The non-transitory computer-readable medium of claim 25, wherein the handover procedure is a random access channel-less procedure and is determined to be used based on a determination that uplink time synchronization is established with the SN.

27. An apparatus for wireless communication, comprising:

means for receiving a configuration for a plurality of secondary nodes (SNs);

means for receiving a command to communicate via an SN of the plurality of the SNs;

means for determining a handover procedure that is to be used to establish a connection with the SN; and means for performing the handover procedure to establish the connection with the SN, the handover procedure including selecting a TCI state of one or more TCI states identified in the configuration for the SN and transmitting, to the SN and using a beam indicated by the TCI state, a message indicating a switch to the SN for dual connectivity with a master node.

28. The apparatus of claim 27, wherein the handover procedure is a random access channel-less procedure and is determined to be used based on a determination that uplink time synchronization is established with the SN.

* * * * *